(12) United States Patent
Aylward et al.

(10) Patent No.: US 11,388,246 B2
(45) Date of Patent: Jul. 12, 2022

(54) METHOD FOR PROVIDING INFORMATION ABOUT AN OBJECT AND AN OBJECT PROVIDING INFORMATION

(71) Applicant: Sony Corporation, Tokyo (JP)

(72) Inventors: Conor Aylward, Stuttgart (DE); Philip Marivoet, Stuttgart (DE)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/041,448

(22) PCT Filed: Feb. 20, 2019

(86) PCT No.: PCT/EP2019/054161
§ 371 (c)(1),
(2) Date: Sep. 25, 2020

(87) PCT Pub. No.: WO2019/185244
PCT Pub. Date: Oct. 3, 2019

(65) Prior Publication Data
US 2021/0021680 A1    Jan. 21, 2021

(30) Foreign Application Priority Data
Mar. 26, 2018  (EP) .................................... 18164067

(51) Int. Cl.
| | | |
|---|---|---|
| *H04L 67/306* | (2022.01) | |
| *H04L 67/12* | (2022.01) | |
| *H04L 67/50* | (2022.01) | |
| *H04L 67/54* | (2022.01) | |

(52) U.S. Cl.
CPC .............. *H04L 67/22* (2013.01); *H04L 67/24* (2013.01); *H04L 67/306* (2013.01)

(58) Field of Classification Search
CPC ....... H04L 67/22; H04L 67/24; H04L 67/306; H04L 67/12
See application file for complete search history.

(56) References Cited

U.S. PATENT DOCUMENTS

| | | |
|---|---|---|
| 7,587,718 B1 | 9/2009 | Mincarelli et al. |
| 7,631,362 B2 | 12/2009 | Ramsey |
| 8,566,956 B2 | 10/2013 | Slater |
| 9,298,899 B1 | 3/2016 | Moloian et al. |
| 2005/0086529 A1 | 4/2005 | Buchsbaum |
| 2005/0222801 A1 | 10/2005 | Wulff et al. |
| 2009/0249497 A1* | 10/2009 | Fitzgerald ........... H04W 12/082 726/35 |
| 2013/0073450 A1* | 3/2013 | Swan .................... G06Q 40/00 705/39 |

(Continued)

OTHER PUBLICATIONS

International Search Report and Written Opinion dated Apr. 10, 2019 for PCT/EP2019/054161 filed on Feb. 20, 2019, 9 pages.

*Primary Examiner* — Soe Hlaing
(74) *Attorney, Agent, or Firm* — Xsensus LLP (57) ABSTRACT

A method for providing information about an object is proposed. The method contains determining a usage profile of the object based on a measurement performed by at least one sensor of the object and storing the usage profile. The usage profile can be compared with a standard profile of the object. Based on a result of the comparison information about a usage of the object can be provided. A corresponding object providing information is proposed.

18 Claims, 3 Drawing Sheets

(56) References Cited

U.S. PATENT DOCUMENTS

| | | | |
|---|---|---|---|
| 2016/0150298 A1* | 5/2016 | Kim | H04L 67/12 |
| | | | 340/870.02 |
| 2017/0027229 A1* | 2/2017 | Cameron | A24F 40/60 |
| 2017/0046752 A1 | 2/2017 | Diester et al. | |
| 2020/0074571 A1* | 3/2020 | Boyle | G06F 16/29 |

* cited by examiner

METHOD FOR PROVIDING INFORMATION ABOUT AN OBJECT AND AN OBJECT PROVIDING INFORMATION

CROSS-REFERENCE TO RELATED APPLICATIONS

The present application is based on PCT filing PCT/EP2019/054161, filed Feb. 20, 2019, which claims priority to EP 18164067.3, filed Mar. 26, 2018, the entire contents of each are incorporated herein by reference.

FIELD

Example implementations of the present disclosure relate to concepts for providing information about an object. A method for providing information about an object and a corresponding object providing information are proposed.

BACKGROUND

Various objects or resources can be shared amongst different users. Shared objects can be successively used by a plurality of users and be provided to the users by a sharing service. A shared object can also be sold from a former user to a next user. Shared objects can for example be electronic objects like cameras, electromechanical objects like working tools or mobile objects like cars or bicycles. A potential new user of the object or an operator of the sharing service may be interested to have information about the object. A new user may wish to estimate the functionality or condition of the object to be able to decide whether or not to use the object.

Information about the object can extend trust in e.g. the functionality of the shared object, e.g. being used in a sharing service. This allows subsequent users of the object to have trust in the condition and expected behavior of the object. For providing information, it is possible that a user gives feedback about the object after he has used it, e.g. by giving information about how he experienced using the object or by rating the object. However, user feedback might provide only subjective information from the user. A user might give feedback that the object would show a normal functionality although a functionality of the object shows a defect, perhaps not perceived by the user. A user might use the object incorrectly but give feedback that the object works fine, or he might skip rating the object after using it and no information may be available about the object.

It is desired to provide improved concepts for providing information about an object.

SUMMARY

This need is met by methods and objects in accordance with the independent claims. Advantageous embodiments are addressed by the dependent claims.

An embodiment relates to a method for providing information about an object. According to the method, a usage profile of the object is determined based on a measurement performed by at least one sensor of the object. The determined usage profile is stored. The usage profile is compared with a standard profile of the object. Further, information about a usage of the object is provided based on a result of the comparison.

Another embodiment relates to an object configured to provide information about a usage of the object. The object comprises a sensor configured to measure a usage of the object and to store a corresponding measurement on a memory of the object. The object further comprises circuitry configured to determine a usage profile of the object based on the stored measurement. The circuitry is further configured to compare the usage profile with a standard profile of the object and to provide information about a usage of the object based on a comparison result. The standard profile may be stored on the memory of the object.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
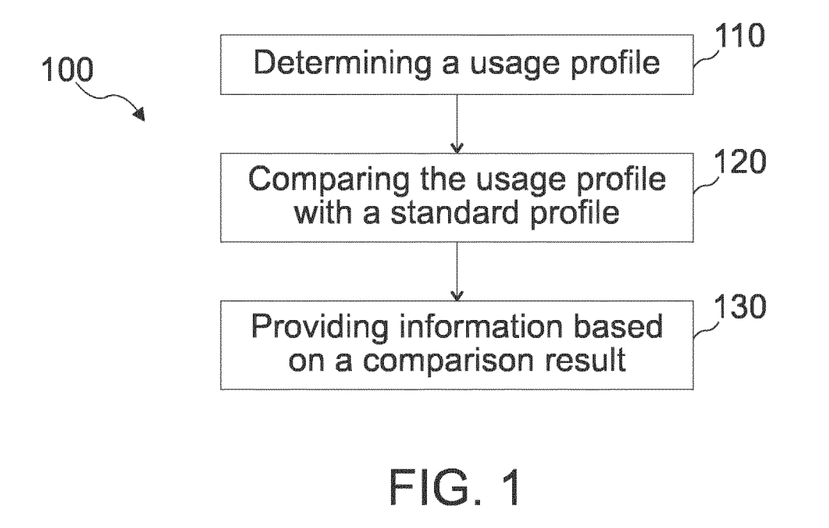
FIG. 1 shows a flow chart of an embodiment of a method for providing information.

FIG. 1 shows an embodiment of a method 100 for providing information about an object. Method 100 comprises determining a usage profile 110 of the object. The usage profile is based on a measurement performed by at least one sensor of the object and stored, e.g., on a memory or storage of the object. The object can be equipped with a sensor and be configured to track how it is used by utilizing the sensor for measuring its usage. After determining the usage profile, the usage profile may be evaluated to generate objective information about the usage of the object. Accordingly, the method comprises comparing the usage profile with a standard profile of the object. A standard profile comprises information about a standard usage or normal usage of the object. The standard profile can comprise information related to measurement data provided by the at least one sensor. For example, the standard profile comprises information about at least one of a standard frequency of usage of the object, an intensity of the usage of the object, and a standard environment where the object is normally used or is intended to be used. Using a standard profile may facilitate an objective evaluation of the usage of the object and e.g. to determine whether the object was used in a regular way or not.

According to the method it is possible to provide information 130 about a usage of the object based on a result of the comparison of the usage profile 120 with the standard profile. Information can be provided 130 with respect to a degree of deviation of the usage according to the usage profile from a normal usage according to the standard profile. The standard profile may comprise limit sensor values indicating permissible measurement values of the sensor during a usage of the object. A standard usage range of the standard profile could be limited by a lower limit sensor value and an upper limit sensor value. If all measured sensor values of the usage profile are within the standard usage range, information could be provided 130 that the object was used regularly. By contrast, if a sensor value of the usage profile exceeds the standard usage range, information could be provided 130 that the object was used irregularly. Irregular use e.g. can indicate misuse of the object by a user. A potential new user having the information about irregular prior usage of the object could inspect the object very carefully before using the object and/or use the object carefully until he has verified correct functionality of the object. A provider of the shared object could check the object for irregular functionality and/or damage of the object after irregular usage. By providing information 130 about the usage based on the comparison result (e.g. a message "the object was always used in a normal way" or "the object was used in an irregular way at least once"), it can be easy for the new user or the operator of a sharing service to control whether or not the object was used normally. Alternatively or additionally, the usage profile could be provided to enable the new user or the operator to manually evaluate the prior usage of the object, e.g. to get a detailed insight on a kind of abnormal usage.

The object to be evaluated with respect to its usage could be any object comprising a sensor and electrical circuitry for reading out the sensor and processing the respective sensor data. For example, an object could be an electrical object or an electromechanical object. The object could be mobile or immobile. A mobile object could be a vehicle, a transport vehicle, a vessel or an object moving in the air, e.g. an aircraft, a helicopter and/or a drone. A mobile object could be a two wheels vehicle, e.g. a bicycle. The object could be a car provided by a car sharing service or a bicycle provided by a bike sharing service. The object could alternatively be a working tool like a drilling machine, a lawnmower, or any other working tool e.g. comprising a motor, that could be rented by a user. The object could be an electrical device or a consumer device like a camera, a mobile phone and/or a game console. The object could be immobile, e.g. a smart house, a smart apartment or a smart public working space, e.g. rented to different users by a renting service or an online renting service. A smart immobile object can comprise at least one sensor to measure its usage (as sensors for determining humidity, temperature, how many persons are in a room, are doors/windows opened/closed, etc.). The method enables to provide information about a usage of a plurality of different objects.

As objects used according to the method can differ from each other with respect to their kind and/or utilization, also the sensors used for determining the usage profile 110 and corresponding standard profiles can vary. A sensor may be e.g. an electrical sensor, an electromechanical sensor and/or an electrochemical sensor. A sensor can be provided depending on a kind of the object. For example, a mobile object may comprise an acceleration sensor, a speed sensor, a temperature sensor, and/or a revolution counter of a motor. The sensor may be a positioning sensor. The sensors could measure a kinetic usage profile of the mobile object. A kinetic usage profile might comprise acceleration, e.g. a frequency of acceleration and/or strength of acceleration. A kinetic usage profile might comprise a speed, an average speed, a maximum speed, and local maxima in a speed profile. A sensor may determine an object setting or a usage of a servo drive of the object (e.g. for opening a window or adjusting a seat).

The object may comprise a plurality of sensors and the usage profile may comprise sensor data provided by sensors of the plurality of sensors. Providing sensor data by different sensor types may increase an accuracy of the usage profile. Classifying usage of the object as normal or abnormal may be enhanced by considering sensor data from more than one sensor. For example, if a rain sensor indicates rain and the second sensor indicates that a window of the object is open, the object could be used carelessly (or in an abnormal way), whereas an open window could be permissible when it does not rain.

A comparison of the usage profile 120 may comprise a comparison of sensor values of the usage profile with values of the standard profile corresponding to the sensor used for generating the usage profile. As the usage profile may be generated by using a plurality of sensors, the standard profile may comprise standard values for the plurality of sensors. It may be possible that the values of the usage profile are within the standard range of the standard profile with respect to one sensor, and provided information 130 can indicate that the object was at least partly used in a normal way.

For comparing the usage profile 120, stored values of the usage profile may be averaged. Comparing may comprise correlating the usage profile with the standard profile and provide the correlation result. High correlation may indicate a normal usage of the object, whereas weak correlation may indicate an abnormal usage of the object. A level of a correlation value could indicate a degree of normal/abnormal usage. For example, the information about the usage could be provided 130, e.g. depending on the correlation value, by terms of a score, e.g. from 1 to 5, wherein 5 could indicate fully normal usage and 1 could indicate fully abnormal usage.

A standard profile could comprise values of the sensor that are measured during normal and/or permissible usage of the object. For example, the object may be tested by a manufacturer with respect to a normal usage scenario of the object. The sensor data measured during this normal usage scenario could be provided to the standard profile. The standard profile could comprise a maximum sensor value. For example, the maximum sensor value could be set according to a usage limitation of the object. The usage limitation could indicate a limit of usage to that continuous functionality of the object can be guaranteed. The standard profile could be a standard profile of the object, e.g. of the object itself or an identical object with respect to a type of object (e.g. an object of a same production series or an object of an identical type as the object produced in the same year as the object). A standard profile could be generated using one object and be provided to a plurality of objects.

For example, the object may generate the standard profile by use of former usage of the object. The object may detect when the current profile is very different (outlier) when compared to the previously stored ones. In an example, at a first day, the object has no usage profiles available. In a first embodiment, the device gradually learns the common/standard profile. After a number of users having used the object, it may be able to determine that the current user is an outlier when compared to the previous ones. According to this embodiment, the standard profile may be available after a certain time. In a second embodiment, the object may load the profiles from a same object that has been used many times (via some service, e.g. via an Internet connection or direct connection with the same object). In the second embodiment, the standard profile can be obtained by transfer learning.

Optionally, the standard profile may comprise a threshold value and a measurement value of the usage profile is compared with the threshold value for the sensor. A threshold value may indicate a specific usage of the object (e.g. a speed or acceleration value for a mobile object and/or humidity or temperature value for an immobile object). For example, a threshold value may be chosen to exceed a sensor value measured during normal usage of the object with a probability of at least 80% (or at least 90%, or at least 95%). A usage profile could be generated by measuring a plurality of sensor values. A certain number of sensor values of the usage profile may be lower than the threshold value and a remaining number may exceed the threshold value. If e.g. less than 20% (or less than 10% or less than 5%, respectively) of the measured sensor values exceed the threshold value, provided information could comprise that the device was used normally. Alternatively, if more than 20% (or more than 10% or more than 5%, respectively) of the measured sensor values exceed the threshold value, the information could comprise that the device was used different from a standard usage according to the standard profile or irregularly. The standard profile could comprise a plurality of threshold values to enable to determine a degree of abnormal usage for example. For example, the threshold values of the standard profile may be continuously varied, e.g. by continuously evaluating usage profiles and using machine learning techniques. Machine learning techniques may be used to identify normal versus abnormal profiles. There may be a plurality of types of linear and non-linear relationships that may be used for detecting variations from the standard profile.

Normal usage of an object may depend on an environment where the object is used. According to an embodiment, the usage profile comprises information about an environment of the object during the usage. Information about the environment can be provided by at least one environmental sensor of the object. The environmental sensor can be provided additionally to the at least one sensor of the object in an embodiment. Alternatively, the environmental sensor can be the at least one sensor of the object. For example, a rain sensor may be used as the at least one sensor of the object and as the environmental sensor simultaneously. An environmental sensor could be a humidity sensor, a temperature sensor or a light sensor. The environment could be a location determined by a positioning sensor, e.g. a GPS sensor. A normal usage of the object could depend on the environment where the object is used. Accordingly, a standard profile can be adapted with respect to the environmental data of the usage profile. For example, a normal speed of a mobile object (like a car or a bicycle) may be higher on a tarred road than on a paved road or on a gravel road. The type of road may be determined according to GPS information of the object and information of an assigned road map, or by a camera of the object, for example. The camera may record the environment and an image recognition system may determine a type of the road on that the mobile object is used. In some cases it may be useful to relate the usage of the object to external data like maps. These maps could for example be used as input to the driving if the object is a car or a vehicle. Date and time of the usage of the device may be combined with the position and the maps could be examined with respect to a terrain, for example, and/or to weather conditions at the time of usage for providing environmental information. Resulting details may be fed to the device or the usage profile may be enriched with these resulting details in a service, e.g. an online service or cloud service. Abnormal usage on a gravel road (e.g. higher speed than a highest recommended speed according to the standard profile for gravel roads) may deteriorate a functionality of the mobile object. A standard speed could depend on weather conditions. A standard speed could be lower when the road on that the mobile object is used is dry than when the road is wet and slippery. The standard profile may have a plurality of entries, e.g. threshold values, wherein it may depend on the environmental information which of the entries is used. For example, a first threshold value for a speed used for a car on a highway may be higher than a second threshold value for a speed used for a car in a traffic-calmed sector.

Aspects of the disclosure relate to determining or generating a standard profile for an object. Optionally, the method may comprise storing a plurality of determined usage profiles and generating a standard profile based on the plurality of usage profiles. In other words, one user or a plurality of different users may use the object, and different usage profiles can be determined during a respective usage of the object by the different users. The usage profiles may be averaged, and a standard profile may comprise an average sensor value and/or an average duration of usage of the object and/or an average maximum sensor value. Additionally or alternatively, a maximum sensor value of all usage profiles may be provided as upper limit sensor value of the standard profile. For example, the usage profiles may comprise different patterns of using the object (e.g. a motor of the object), and the standard profile can comprise a pattern with a best match to all available patterns (e.g. by parameterizing a function fitted to the pattern and/or by using a maximum-likelihood-method). In an embodiment, a standard profile is determined for at least a first environment and a second, different environment or for a plurality of different environments.

The standard profile may be determined by the object itself or by another object or for another object of a same kind. Determining the standard profile by averaging or considering a plurality of usage profiles enables generating standard profiles of any objects. Using the plurality of usage profiles may enable generating the standard profiles without need to receive or use a standard profile from an external entity. For example, averaging enables determining standard profiles for different objects as transportation devices, vehicles, bicycles, working tool, smart homes, smart apartments, etc. An object used over a period of time (e.g. the standard profile could be provided after more than a week, more than a month, more than 3 months, more than 6 months or more than a year of usage) by a plurality of users can be estimated to be used normally in average. Deviation of a usage from an average usage could indicate abnormal usage.

For example, if the object breaks during a usage of a user, the maximum sensor value (or a value lower than 95%, lower than 90% or lower than 80% and/or higher than 70% or higher than 80% than the maximum sensor value) of the usage profile of the user could be used as upper limit sensor value of the standard profile. The standard profile could be automatically adapted to a breaking point or load limit of the object.

In an embodiment, the method may comprise obtaining the standard profile from an object of a same type as the object. For example a first object of the first type may be already in use whereas a second object of the first type may be new and use of the second object is about to start. At the first object, a standard profile can be generated by using the existing usage profiles of the first object. As the first and second objects are of the same type it is possible to use the standard profile of the first object also for the second object. In some embodiments, a standard profile fitted to an object may be available already at the time of the first usage, as the standard profile can be transferred to the object from a similar or identical object (e.g. from a same product line, from a same manufacturer and/or objects for a same use like a camera, an apartment, a sport car, a bicycle, etc.).

Optionally, the method may comprise generating a standard profile based on usage profiles of a plurality of objects of a same type as the object. For example, the standard profile can be generated at an online server receiving usage profiles from objects connected to the online server. It may be possible that the first and second object of the first type send their usage profiles to the online server and a general standard profile is generated. The online server can send the general standard profile back to the objects, e.g. regularly (every day, every week, or every month) to update the standard profiles used by the objects. It can be possible that a standard usage of the object changes slowly over the time and the change can be taken into account according to the method. In this way, a normal usage of the object that would have been indicated abnormal by using an old standard profile can be indicated to be normal by using an updated standard profile.

Optionally, the provided information 130 about the usage comprises a score indicating a frequency of abnormal usage of the object. For example, the information can comprise an irregularity ratio of abnormal uses of the object to all uses of the object. If the irregularity ratio is too high (e.g. higher than 50%), a user could decide not to use the object, or an operator of a sharing service could decide to check the functionality and/or condition of the object. Alternatively, a regularity ratio of the information can comprise a ratio of normal uses of the object to all uses of the object. The regularity ratio could indicate a probability of an error-free functionality of the object, as normal used objects may have a lower risk of malfunction. For generating the respective ratio it may be possible to use the overall time of abnormal/normal usage to the overall time of usage. It may also be possible to use the number of users who used the object abnormally compared to the overall number of users of the object.

Optionally, the provided information 130 about the usage of the object is further based on a user rating provided to the object by a user of the object. For example, a user can rate the object after using it. The user rating can be compared with the automatically generated usage profile. If the usage profile indicates normal usage of the object, the user rating could be added to the information or added with a high relevance. If the usage profile indicates abnormal usage of the object, the user rating could be removed from the information or added to the information with a low relevance. User ratings can be interpreted according to the method, e.g. a user rating of a user who does not use the object normally could be less informative for a following user than a user rating of a user who uses the object normally. User rating can be improved by additionally providing the circumstances the user has rated the device in. The user rating could be combined with the regularity ratio to increase an accuracy of the determined information about the usage of the object and/or to provide information about a condition or functionality of the object.

According to an embodiment of the method, the usage profile is associated with a first user using the object during determining the usage profile. For associating the usage profile to a specific user, a user can be determined or identified by a circuit for user identification, e.g. by a biometric sensor and/or based on a user account, for example if the user has rented the object by using the user account. A biometric sensor may be a fingerprint reader, a voice recognition system, or an iris scanner. Biometric data of users may be stored to the object data from the biometric sensor may be compared with stored data for identifying a user. A new user may provide biometric data to the object before starting to use the object. User identification may be based on a key (e.g. of a car) the user is using, the key being assigned to the user and/or a mobile device of the user connected to the object. An application on a mobile phone connected to the object may provide to the object information about the identity of the user. For example, it can be determined how a specific user uses the object. A first user could use the object irregularly and a second and third user could use it normally. The owner of the object could identify which user has used the object irregularly.

Optionally, the previous embodiment comprises providing the comparison result based on the usage profile of the first user to an internet server. The internet server may be the internet server of an operator of a sharing service providing the object. The comparison result may be sent to the internet server during usage of the object by the first user. For example, information about abnormal usage by the first user may be available on the internet server within less than 10 min. (or less than 5 min. or less than 1 min.) after the first user has misused the object. The operator may be able to instantaneously take measures to prevent further misuse. The comparison result may be sent to the internet server after every usage of a user and/or when a user of the object changes.

Optionally, the method comprises providing information about the first user based on the usage profile assigned to the first user, the information comprising a deviation of a usage or behavior of the first user compared to a standard user. For example it may be possible to determine that the first user has misused the object with a deviation of more than 20% from a standard usage of the object and that a fourth user has misused the object with a deviation of more than 40% from a standard usage. For example, if after a time the object breaks, it could be possible to determine that an influence of the fourth user onto the damage of the object was higher than an influence of the first user.

The usage profile may be stored on a data storage or memory of the object, e.g. a tamperproof memory or a non-volatile memory. The non-volatile memory may be a programmable read only memory (PROM). A PROM may be a read-only memory that can only be written once. Thereafter, the written data may be read out as often as desired but it may be no longer possible to change the data. Alternatively or additionally, the usage profile could be stored on a cloud server or an internet server. For example, the object can be connected to the internet and upload the usage profile regularly, e.g. once a day, once a week or after every hour of usage. For example, the usage profile could be uploaded every time when a user of the object changes and a subsequent user starts using the object. When a new user starts using the object, a new usage profile for the new user may be created. For example, for each user an individual usage profile can be generated which is associated with that user and that can be e.g. reconfigured when the respective user uses the object again (e.g. after having paused using the object for a while).

The usage profile could be determined by regularly storing a value of a sensor, e.g. storing measurement data several times per second, every second, every 10 seconds, once per minute, every 5 minutes, or every 10 minutes. The stored sensor value could comprise an average value of measured values of the time period between the storing time and the previous storing time. Averaging could enable providing a usage value at reduced memory space requirements and at reduced costs while maintaining an accuracy of the usage profile. Storing measurement data on an online server could be executed faster due to less data volume of the usage profile with averaged sensor values. A higher frequency of storing sensor data could increase an accuracy of the usage profile. Alternatively, an analog sensor could continuously store measured data on an analog memory storage or quasi-continuously store data on a digital memory storage (e.g. with a sample rate higher than 1 Hz, or higher than 20 Hz, or higher than 100 Hz) of the object.

Figure 2:
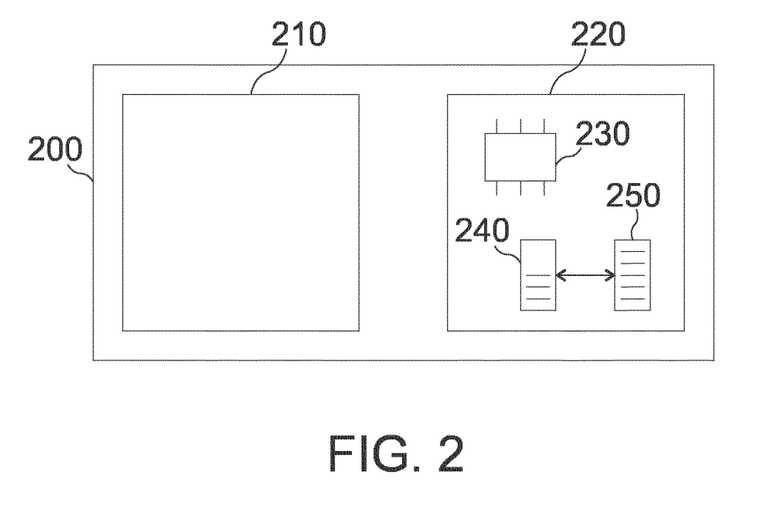
FIG. 2 shows an illustration of an embodiment of an object providing information.

FIG. 2 shows an illustration of an embodiment of an object 200. The object 200 comprises a sensor 210 configured to measure a usage of the object and to store a corresponding measurement on a memory 230 of the object. The object 200 further comprises circuitry 220 configured to determine a usage profile 240 of the object 200 based on the measurement and to compare the usage profile with a standard profile 250 of the object 200. The standard profile 250 can be stored on the memory of the object or alternatively provided to the object via an internet connection by an online server. The circuitry 220 is further configured to provide information about a usage of the object based on a comparison result. The object providing information about its prior usage may enable a potential user of the object getting information about the object quickly. A user could request the information, e.g. remotely, by using a mobile device connected to the object via a remote connection, e.g. a wireless connection like WLAN or Bluetooth and/or via an internet connection. The user could get information about a prior usage of the object on his mobile device. Information about the usage can comprise whether the object has been used regularly or to what degree the object had been misused. A functional safety score for the object could be provided as information about the object. The provided information could comprise respective user ratings of previous users of the object. At least parts of the circuitry 220 may be implemented on a remote server, an online server and/or a cloud server. For example, the complete circuitry 220 may be implemented on the remote server.

Optionally, the object comprises a graphical display. The object can be configured to show the information about the usage on the graphical display upon a request of a user of the object or of a potential new user of the object. Showing information on the display of the object directly to the user may further facilitate getting information about prior usage of the object for the user.

More details and aspects are mentioned in connection with the embodiments described above or below. The embodiments shown in FIG. 2 may comprise one or more optional additional features corresponding to one or more aspects mentioned in connection with the proposed concept or embodiments described above or below (e.g. FIGS. 1 and 3 or 4).

Figure 3:
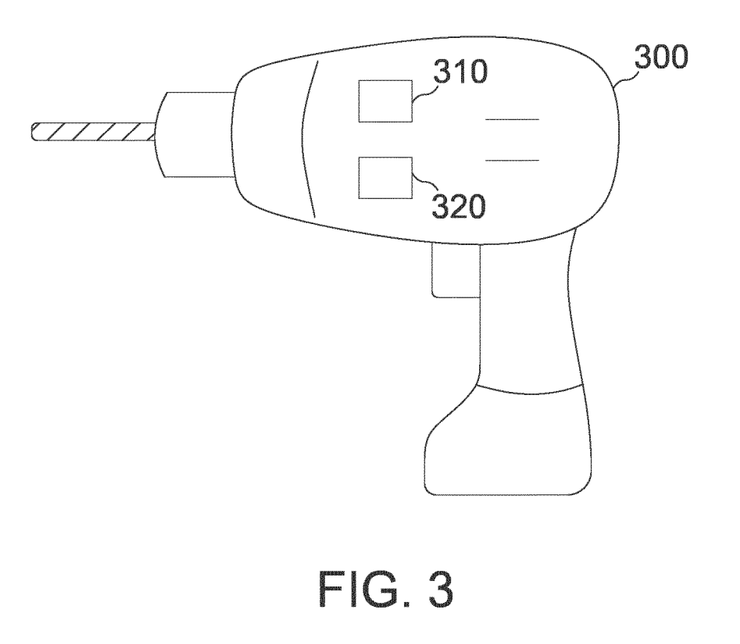
FIG. 3 shows a schematic illustration of an example of a shared working tool providing information about the usage of the shared working tool.

FIG. 3 shows a schematic illustration of an example of a shared working tool 300 providing information about the usage of the shared working tool 300. The shared working tool 300 according to the illustration could be a drilling machine. Alternatively, the shared working tool 300 could be a grinding machine, a milling machine or any other kind of working tool with a motor, e.g. an electrical motor. The shared working tool 300 can comprise a first sensor 310 configured to measure a usage of the motor of the shared working tool 300, e.g. a duration of usage in hours, a percentage of the duration of usage in a full power mode, an average revolutions per minute value of the motor, and/or a maximum revolutions per minute value of the motor. The standard profile of the revolutions per minute value of the motor may comprise a temporal standard of normal usage of full power (or a temporal limit of overall usage time). For example, the shared working tool 300 could be regularly rented to private users, and the renting service could determine that the shared working tool 300 was probably used by a professional user when the temporal limit is exceeded, by comparing the generated usage profile of the shared working tool 300 with the standard profile. A potentially new user could decide to use, buy or rent the working tool, e.g. if it was used normally before. Alternatively, if the working tool was used irregularly, he could decide not to use it as e.g. a performance of the working tool could be deteriorated due to the irregular prior usage.

The shared working tool 300 can further comprise an environmental sensor 320. The environmental sensor 320 could be a humidity sensor or a temperature sensor. For example, the shared working tool 300 could be rented for usage allowed at temperatures higher than 0° C. and lower than 50° C. Accordingly, the standard profile could comprise a lower limit sensor value of 0 C and an upper limit sensor value of 50° C. The operator of the rental service could check the usage profile of a user after the return of the shared working tool 300 and verify if the shared working tool 300 was used within the allowed temperature range by the user. If the shared working tool 300 was not used regularly, the operator could decide to charge an extra fee from the user and/or exclude the user from the rental service.

Figure 4:
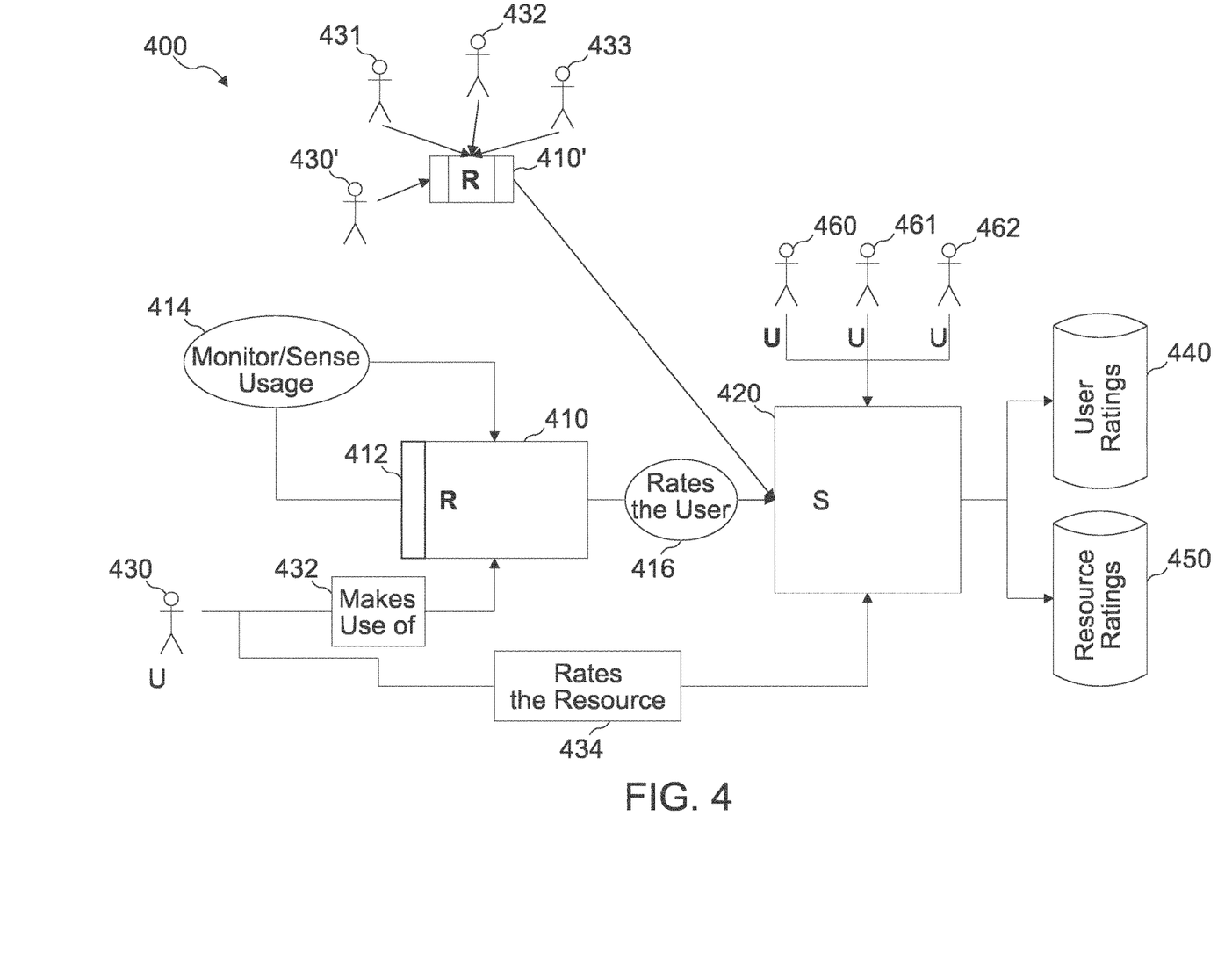
FIG. 4 shows an illustration of an example of a system with a shared resource.

FIG. 4 shows an illustration of a system 400 with a shared resource (R) 410, 410' and a service (S) 420 providing the shared resource 410, 410' and/or being connected to the shared resource 410, 410'. The shared resource could be an object configured to provide information as described above. The resource can be used by many users sharing the resource. The resource can be an intelligent resource that is configured to rate its user compared to other users or compared to some expected usage model (standard profile). A sensor 412 of the resource is configured to provide a usage information 414 e.g. to the resource. Depending on the usage information 414, the resource may send a rating of a user 416 to the service 420. The resource may be used by different users (U) 430, 430', 431, 432, and/or 433, for example subsequently.

According to an example of system 400, user 430 rents the resource 410. Resource 410 could be a car provided by a car sharing service, e.g. the service 420. User 430 may have access 432 to the car for a duration of the rental. After returning the car to the service, the user could give a user feedback 434 to the service. After returning the car to the service, the car may give a rating of a user 416 about the user 430 to the service 420. The user rating could depend on usage information 414 determined by sensor 412 during the usage of the car by user 430. The sensor 412 may be a speed sensor, and the usage information 414 (e.g. an average speed and/or a maximum speed) of the usage profile associated with the user 430 may be compared with a standard profile of the car. For example, an acceleration sensor (e.g. the sensor 412 according to an embodiment, or, alternatively, an additional sensor) could measure strong accelerations with a frequency higher than a standard frequency. Consequently, the car can evaluate that the car was used abnormally by the user 430, and the rating of the user 416 could indicate that user 430 has used the car irregularly. The speed sensor may measure a speed for the usage profile of user 430 and compare it to a speed of the standard profile. If the usage profile of the user 430 regularly exceeds a standard speed value of the standard profile, the rating of the user 416 could be low and indicate that user 416 is an irresponsible driver. The service may have the possibility to collect ratings of the user 416 in collected user ratings 440 and e.g. limit access to the car for user 430 depending on the user ratings 440. The service providing the shared resource can identify bad users and help to build trust in the resource by showing its ratings.

It may be possible for the service to provide resource ratings 450, e.g. about the resource 410 and other resources of the service. Prospective users 460, 461, 462 of the resource 410 may request information about the resource before using it. Future users' trust in the resource may be increased based on the both other user ratings and ratings of the resource, e.g. showing the resource was well treated. For example, according to the previous example, the car could have been used irregularly with respect to the acceleration profile of the car, indicating a potentially limited functionality of the car. User 460 may decide based on the respective resource rating 450 whether he wants to use the car or not (e.g. he could use another car of the car sharing service used regularly before and thus having a higher probability of full functionality). The resource 410 of system 400 was mainly presented as a shared car but it could also be any other kind of sharable object, e.g. a bicycle, a working tool, or an apartment. The service 420 could provide resource information about any kind of object or device provided by the service 420. Other methods relying only on ratings of a user may provide only subjective information, or outsiders may game the ratings and manipulate them.

Further examples relate to a computer program (not shown) having a program code for performing any of the methods described above, when the computer program is executed on a computer, a processor, or a programmable hardware component.

The proposed concepts may be used in the environment or applications of the so called sharing economy (e.g. providing services to enable sharing devices amongst a group of users) where trust to a shared object or resources may be a key requirement. According to other concepts, trust may be built by user reviews of users of the sharing company and its resources. However, a user may have very little knowledge of how the shared resource was previously used.

The concepts provided in this disclosure may help to extend the trust users have in the resources offered by the sharing service. This may be achieved by allowing the resource being used to return a rating and report on how it was used. Resources that were misused could be removed or avoided by users as a consequence. The proposed concepts may further allow the sharing service to identify users abusing the resources and take actions on them, e.g. excluding them from the sharing service and/or increasing a rental charge.

Those skilled in the art will appreciate that the proposed concepts may easily be used with all kinds of devices comprising sensors to determine a usage of the respective device. Said devices may be intelligent enough to gather data to sense how they are being used. These are devices that are configured or are configurable to build a profile of normal and abnormal usage behaviors.

An intelligent resource with sensors, computation circuitry and storage is proposed. The resource has the ability to build a profile of how it is used and the external conditions where it is being used. Based on anomaly algorithms and/or previously trained behavioural models downloaded from the same resource type either from a central service or via a P2P (P2P: peer-to-peer) connection. The resource may be configured to calculate an anomaly score indicating the probability that it is being misused in some way. With labelled historical data it may even be able to identify the misuse scenario. This scoring and report may be exported to a central service and/or could be displayed on the resource itself. Accordingly, a subsequent user may have the possibility to check the score. The user thus may have knowledge about and/or trust in the condition of the resource and can make a decision on whether to use it or not. The anomaly score can be turned into a trust score. The trust score can be combined with other sources of data to make a final rating on condition of the Resource.

It may be further possible for the sharing service to exclude any user who has shown to have (e.g. highly probably) misused the resource or has a history of misuse of resources, e.g. the user may have misused some.

Examples relate to intelligent resource analysis and rating of its user or users. The intelligent resource may be the object according to the proposed concepts. More and more business are turning to a sharing model where multiple users can share a resource. More and more resources are becoming more intelligent with more computational performance (central processing unit), memory and sensors. This enables them to sense how they are used and the world (environment) around them.

The disclosure describes how trust can be extended for shared resources. It relies on the intelligent resource itself making a rating of how it was used or misused. This rating, possibly combined with other sources of trust, can be exposed to users to help them trust in the resource they are sharing. This rating can be further used to exclude users that maliciously misuse shared resources The proposed feature (method) can be used to differentiate from shared objects provided by other sharing services. It will be clearly visible on the interface in a service/product offered by a business to its users. The business could provide documentation explaining how the feature works.

The following examples pertain to further embodiments.

(1) A method for providing information about an object, the method comprising: determining a usage profile of the object based on a measurement performed by at least one sensor of the object and storing the usage profile; comparing the usage profile with a standard profile of the object; and providing information about a usage of the object based on a result of the comparison.

(2) The method according to (1), wherein the standard profile comprises at least one threshold value for the at least one sensor of the object and a measurement value of the usage profile is compared with the respective threshold value for the sensor.

(3) The method according to (1) or (2), wherein the usage profile comprises information about an environment of the object during the usage, provided by at least one environmental sensor of the object.

(4) The method according to (3), wherein the standard profile is adapted corresponding to the information about the environment.

(5) The method according to any of (1) to (4), comprising storing a plurality of determined usage profiles and generating a standard profile based on the plurality of us-age profiles.

(6) The method according to any of (1) to (5), comprising providing the standard profile by transferring the standard profile from an object of a same type as the object to the object.

(7) The method according to any of (1) to (6), comprising generating a standard profile based on usage profiles of a plurality of objects of a same type as the object.

(8) The method according to any of (1) to (7), wherein the information about the usage comprises a score indicating a frequency of abnormal usage of the object.

(9) The method according to any of (1) to (8), wherein the information about the usage of the object is further based on a user rating provided to the object by a user of the object.

(10) The method according to any of (1) to (9), wherein the usage profile is stored assigned to a first user using the object during determining the usage profile.

(11) The method according to (10), further comprising providing the comparison result based on the usage profile of the first user to an internet server.

(12) The method according to one of (10) or (11), comprising providing information about the first user based on the usage profile assigned to the first user, the information comprising a deviation of a usage of behavior of the first user compared to a standard user.

(13) A computer program having a program code for performing any of the methods of (1) to (12), when the computer program is executed on a computer, a processor, or a programmable hardware component.

(14) An object comprising: a sensor configured to measure a usage of the object and to store a corresponding measurement on a memory of the object; and circuitry configured to determining a usage profile of the object based on the measurement; comparing the usage profile with a standard profile of the object, the standard profile stored on the memory of the object; and providing information about a usage of the object based on a comparison result.

(15) The object according to (14), comprising a graphical display, wherein the object is configured to show the information about the usage on the graphical display upon a request of a user of the object.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for providing information about an object, the method comprising:
   determining a usage profile of the object based on a measurement performed by at least one sensor of the object and storing the usage profile;
   comparing the usage profile with a standard profile of the object, wherein the standard profile of the object includes a normal usage of the object for an objective evaluation of the usage of the object, the normal usage including values of the at least one sensor measured during a predetermined permissible usage of the object, wherein the standard profile comprises at least one threshold value for the at least one sensor of the object, wherein the at least one threshold value of the standard profile is continuously varied in response to continually evaluating the usage profile; and
   providing information about a usage of the object based on a result of the comparison,
   wherein in response to less than a predetermined percentage of measured sensor values exceeding the at least one threshold value, determining that the device was used according to the standard profile, and
   wherein in response to more than a predetermined percentage of measured sensor values exceeding the at least one threshold value, determining that the device was not used according to the standard profile.

2. The method according to claim 1, wherein the usage profile comprises information about an environment of the object during the usage, provided by at least one environmental sensor of the object.

3. The method according to claim 1, wherein a measurement value of the usage profile is compared with the respective threshold value for the sensor.

4. The method according to claim 1, comprising storing a plurality of determined usage profiles associated with different users and generating a standard profile based on the plurality of usage profiles.

5. The method according to claim 1, wherein the standard profile is obtained from an object of a same type.

6. The method according to claim 1, comprising generating a standard profile based on usage profiles of a plurality of objects of a same type as the object.

7. The method according to claim 1, wherein the information about the usage comprises a score indicating a frequency of abnormal usage of the object.

8. The method according to claim 1, wherein the information about the usage of the object is further based on a user rating provided to the object by a user of the object.

9. The method according to claim 1, wherein the object the information is provided about is a shared object.

10. The method according to claim 1, wherein the usage profile is associated with a first user and the usage profile is determined within the time the first user uses the object.

11. The method according to claim 10, wherein the first user is identified by circuitry of the object, the circuitry configured to identify the user.

12. The method according to claim 10, further comprising providing information about the usage profile and/or the comparison result based on the usage profile of the first user to a remote server.

13. The method according to claim 10, comprising providing information about the first user based on the usage profile assigned to the first user, the information comprising a deviation of a usage behavior of the first user compared to a standard user.

14. A computer program having a program code for performing the method of claim 1, when the computer program is executed on a computer, a processor, or a programmable hardware component.

15. An object, comprising:
   a sensor configured to measure a usage of the object and a memory to store corresponding measurement data; and
   circuitry configured to
      determine a usage profile of the object based on the measurement;
      compare the usage profile with a standard profile of the object, wherein the standard profile of the object includes a normal usage of the object for an objective evaluation of the usage of the object, the normal usage including values of the at least one sensor measured during a predetermined permissible usage of the object, wherein the standard profile comprises at least one threshold value for the at least one sensor of the object, wherein the at least one threshold value of the standard profile is continuously varied in response to continually evaluating the usage profile; and
      provide information about a usage of the object based on a comparison result, wherein in response to less than a predetermined percentage of measured sensor values exceeding the at least one threshold value, determine that the device was used according to the standard profile, and wherein in response to more than a predetermined percentage of measured sensor values exceeding the at least one threshold value, determine that the device was not used according to the standard profile.

16. The object according to claim 15, comprising a graphical display, wherein the object is configured to show the information about the usage on the graphical display upon a request of a user of the object.

17. The object according to claim 15, comprising at least one circuitry for user identification configured to identify a user of the object for associating the usage profile with the user.

18. The object according to claim 15, comprising a transceiver configured to transmit one of the usage profile, and the information about the usage to a remote server.

* * * * *